(12) United States Patent
Mak et al.

(10) Patent No.: US 8,245,204 B2
(45) Date of Patent: *Aug. 14, 2012

(54) PARAMETER MANAGEMENT USING COMPILER DIRECTIVES

(75) Inventors: Ying Chau Raymond Mak, Thornhill (CA); Wang Dong Chen, Toronto (CA); Larry Alexander Lindsay, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 1170 days.

This patent is subject to a terminal disclaimer.

(21) Appl. No.: 11/967,420

(22) Filed: Dec. 31, 2007

(65) Prior Publication Data

US 2008/0104574 A1 May 1, 2008

Related U.S. Application Data

(63) Continuation of application No. 10/942,428, filed on Sep. 16, 2004, now Pat. No. 7,367,019.

(51) Int. Cl.
*G06F 9/45* (2006.01)
(52) U.S. Cl. ......... 717/140; 717/141; 717/142; 717/143
(58) Field of Classification Search .................. 717/140, 717/141, 142, 143
See application file for complete search history.

(56) References Cited

U.S. PATENT DOCUMENTS

| | | | |
|---|---|---|---|
| 5,857,104 A | 1/1999 | Natarjan et al. | |
| 5,946,488 A | 8/1999 | Tanguay et al. | |
| 5,956,488 A | 9/1999 | Suzuki | |
| 5,999,733 A | 12/1999 | Shamoto | |
| 6,006,235 A | 12/1999 | Macdonald et al. | |
| 6,064,818 A | 5/2000 | Brown et al. | |
| 6,067,542 A | 5/2000 | Carino, Jr. | |
| 6,263,493 B1 | 7/2001 | Ehrman | |
| 6,604,818 B2 | 8/2003 | Leibman et al. | |
| 6,631,516 B1 | 10/2003 | Baumgart et al. | |
| 7,367,019 B2 | 4/2008 | Mak et al. | |

OTHER PUBLICATIONS

Schildt, H. "C/C++ Programmer's Reference", 2000, The McGraw-Hill Companies, Second Edition, p. 55-61.*
Prodan, et al. "Zen: a directive based language for Automatic Experiment Management of Distributed and Parallel Programs", 2002, IEEE, p. 1-8.*
Chakravarty et al., "Functional Array Fusion", Oct. 2001, SIGPLAN Notices, vol. 36, No. 10, pp. 205-216.
Gokhale et al., "NAPA C: Compiling for a Hybrid RISC/FPGA Architecture", IEEE Symposium on FPGAs for Custom Computing Machines, 1998, pp. 126-135.
Kunchithapadam et al., "Optimizing Array Distributions in Data-Parallel Programs", 7th International Workshop Proceedings, pp. 470-484, Berlin, Germany 1995.

(Continued)

*Primary Examiner* — Qamrun Nahar
(74) *Attorney, Agent, or Firm* — Yee & Associates, P.C.; Libby Z. Toub

(57) ABSTRACT

Managing program function parameters using compiler directives is provided. A parameter management system can include a compiler coupled to a primary symbol-type dictionary and a supplemental symbol-type dictionary containing parameter data for specific function calls of corresponding generic type functions. Notably, directive processing logic can be configured both to populate the supplemental symbol-type dictionary based upon processor directives embedded in source code, and also to substitute specific function calls for generic function calls in the source code as specified in the supplemental symbol-type dictionary.

12 Claims, 2 Drawing Sheets

OTHER PUBLICATIONS

Schilling et al., "Automatic Compiler Recognition of Monitor Tasks" ACM Ada Letters, vol. XIV, No. 3, May-Jun. 1994, pp. 91-104.
Schildt, "C/C++ Programmer's Reference Second Edition", Osborne McGraw-Hill, 2000 pp. 55-61.
Doran, "Interfacing Low-Level C Devicw Driver with Ada 95", Litton Guidance and Control System (SigAda 1999), p. 133-143.
Noyelle, "Disciplined C", ACM SIGPLAN Notices vol. 30, No. 12 (Dec. 1995), p. 43-50.
Svennigsson, "Shortcut Fusion for Accumulating Parameters and Zip-like Functions", ICFP-02 (Oct. 4, 2002), p. 124-132.
USPTO Office Action regarding U.S. Appl. No. 10/942,428, dated Jun. 6, 2007.
USPTO Response to Office Action regarding U.S. Appl. No. 10/942,428, dated Sep. 4, 2004.
USPTO Examiners Interview Summary regarding U.S. Appl. No. 10/942,428, dated Sep. 12, 2007.
USPTO Notice of Allowance regarding U.S. Appl. No. 10/942,428, dated Sep. 26, 2007.

* cited by examiner

PARAMETER MANAGEMENT USING COMPILER DIRECTIVES

This application is a continuation of application Ser. No. 10/942,428, filed Sep. 16, 2004, now U.S. Pat. No. 7,367,019 issued Apr. 29, 2008.

BACKGROUND OF THE INVENTION

1. Statement of the Technical Field

The present invention relates to computer programming language processing and more particularly to managing program function parameters using compiler directives.

2. Description of the Related Art

Both structural and functional programming languages specify the function or method mechanism through which computing logic can be compartmentalized into a manageable and reusable form. The conventional function or method (the terms are often used interchangeably) includes a prototype and a body. The prototype often specifies a function name, one or more parameter types for processing in the body, and a return type. The body, in turn, contains program statements which can act upon data local to the function, data external to the function, and data provided through the prototype interface in the form of parameters. Optionally, the body can specify a return value which can be passed out of the function to the calling logic.

Functions operate on the parameters passed into the function through the prototype structure. Consequently, the data types of the parameters can be fixed according to the function definition provided by the prototype. In this regard, where a function is to operate on a variety of different data types for the same parameters, different versions of the function must be created for use in each specific instance for a particular parameter data type. Even where a single function is configured to handle different data types for the same parameter, the logic must be duplicated within the function body and selected according to a selector parameter provided at the time of calling the function.

Notably, designing different functions to handle different data types for the same parameter can be problematic not only from the design standpoint in that different logic will be required for each data type, but also from the perspective that a developer utilizing the function will be required to maintain firm knowledge of the required data types for the parameters when calling the function externally. To overcome at least the latter problem, some modern third-generation languages provide for function overloading. Function overloading permits the end user to call a function using the desired data types as parameters to the function call without requiring the end user to maintain a firm awareness of the specified data types in the function prototype. Rather, the actual use of parameters in the function call can be recognized by the compiler as a selection of the correct version of the function to handle the data types of the actual parameters.

Nevertheless, many heavily utilized third generation programming languages do not support function overloading for several reasons, the principal reason relating to the heavyweight nature of the implementation of function overloading. To provide some semblance of function overloading, however, some programming language implementations support type-generic macros. Type generic macros mimic functional overloading in that either compile time logic of the compiler, or run-time logic of the application can determine the data types of supplied parameters to a function to select an appropriate function to execute.

For instance, in the C programming language, the size of operator can be applied to supplied parameters in a generic macro form of the called function to detect the data types of the parameters. Using the sizeof data, an appropriate specific form of the actual function can be called. It will be recognized, however, that the run-time solution can be code intensive and can result in a performance penalty based upon the necessity to perform comparisons. More importantly, though, where two or more data types have the same size, the sizeof operator will be ineffectual in differentiating between the different data types.

In an alternative implementation, the compiler can be configured to detect a call to a generic form of the function. Referring to an internal compiler table, the compiler can detect the data types of supplied parameters to the generic function to choose an appropriate specific form of the function. Notably, to implement the latter solution, access to the logic of the compiler will be required which can inhibit the modification and management of permissible function prototype forms. Consequently, the latter solution will be ineffectual in the case where a library is to be developed by third-party vendors who do not have access to the internal compiler tables.

SUMMARY OF THE INVENTION

The present invention addresses the deficiencies of the art in respect to managing parameter processing for programmatic function calls and provides a novel and non-obvious method, system, architecture and apparatus for managing program function parameters using compiler directives. A parameter management system can include a compiler coupled to a primary symbol-type dictionary and a supplemental symbol-type dictionary containing parameter data for specific function calls of corresponding generic type functions. Notably, directive processing logic can be configured both to populate the supplemental symbol-type dictionary based upon processor directives embedded in source code, and also to substitute specific function calls for generic function calls in the source code as specified in the supplemental symbol-type dictionary.

A parameter management method can include the steps of detecting a compiler directive disposed in source code and extracting a generic function name, a specific function name and parameter data from the compiler directive. A generic function call having the generic function name can be located in the source code. Consequently, a specific function call having the specific function name can be substituted in the source code for the generic function call. Subsequently, the source code can be compiled.

In a preferred aspect of the invention, wherein the extracting step further can include extracting at least one constraining condition for the parameter data or for a return type. In this regard, the method further can include the step of enforcing the constraining condition for the parameter data. Alternatively, the method can further include the step of inserting an assertion in the source code to enforce the constraining condition for the parameter data. For instance, the method further can include the step of invoking a built-in function based upon the constraining condition. Alternatively, the method can include the step of utilizing the constraining condition to identify compiler optimizations either for the function specified by the function name, or for the function containing the function call.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for parameter management using compiler directives. In accordance with the present invention, a compiler directive can be defined in program source code to specify a generic and specific form of a function associated with specific parameters further specified in the directive. During the compilation process, the compiler directive can be detected and processed to associate a symbol with the specific form of the function in a dictionary of symbols and types. Subsequently, when the generic form of the function is detected in the source code, the information in the dictionary can be used to substitute the specific form with the generic form in the source code in the course of compiling the source code into object code.

Figure 1:
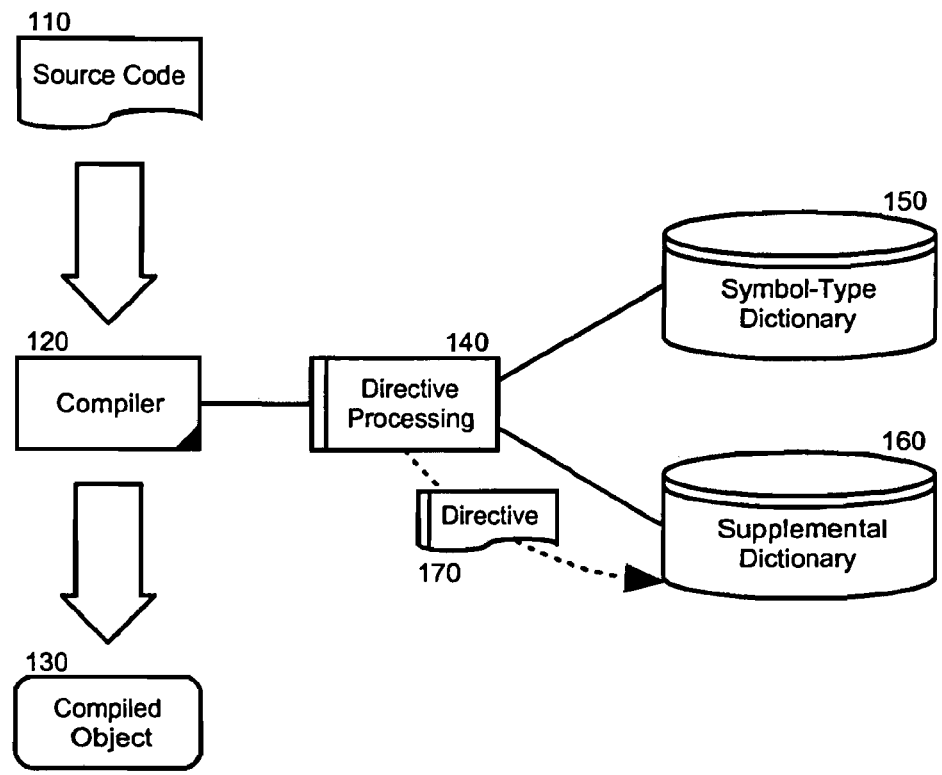
FIG. 1 is a schematic illustration of a software development system configured for managing program function parameters using compiler directives.

In further illustration of the principles of the present invention, FIG. 1 is a schematic illustration of a software development system configured for managing program function parameters using compiler directives. The system can include a source code compiler 120 configured to compile source code 110 into a compiled object 130. The compiler 140 can include directive processing logic 140 programmed to process embedded compiler directives 170 disposed in the source code 110 in the course of compiling the source code 110.

As it is well known in the art, compiler directives generally are compiler supported operations for performing pre-compilation processing. For example, in the C programming language, the "#pragma" operator supports the use of compiler directives embedded in source code. In the present invention, compiler directives can be used to specify generic function types without requiring a hard-coded table disposed within the compiler. In particular, the compiler directive 170 can be used to specify a generic and specific form of a function and associated parameters. Based upon the content of the directive 170, the directive processing logic 140 can populate a supplemental symbol-type dictionary 160 (supplemental to the general symbol-type dictionary 150 ordinarily included as part of a compilation system) with a table entry associating the parameter types with a specific form of a generic function. An exemplary compiler directive can include, for instance:

```
#pragma type_generic_func_def (generic_name,
    specific_name, return_type id0: (condition0),
    parameter_type1: (condition1), parameter_type2
    (condition2) . . . )
```

Figure 2:
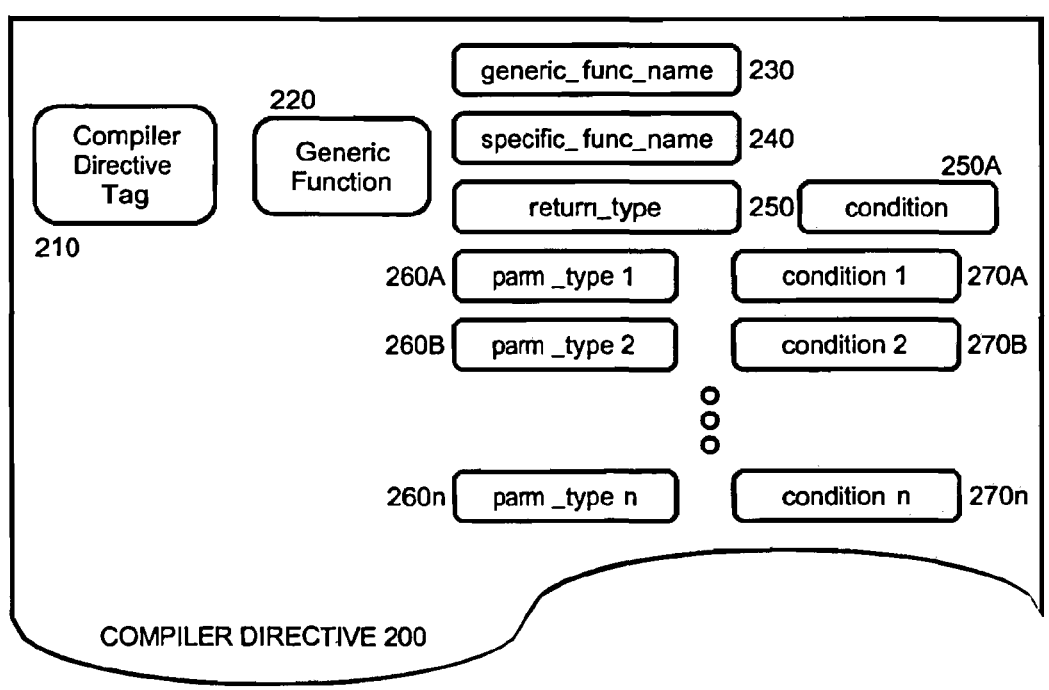
FIG. 2 is a block diagram of a compiler directive configured for program function parameter management; and, FIG. 3 is a flow chart illustrating a process for managing program function parameters using a compiler directive.

In more particular illustration, FIG. 2 is a block diagram of a compiler directive 200 configured for program function parameter management in the system of FIG. 1. The compiler directive 200 can include a compiler directive tag 210, such as the "#pragma" tag in the C programming language. The compiler directive 200 further can include a generic function 220 indicating to the compiler that the compiler directive 200 is to be processed to associate a type-generic function with a specific implementation based upon one or more specified parameters. As such, the compiler directive 200 can include a generic function name 230 and a specific function name 240 as well as a return type 250. Importantly, one or more parameter types 260A, 260B, 260n can be specified in the compiler directive 200.

Optionally, one or more corresponding conditions 270A, 270B, 270n can be specified in association with the one or more parameter types 260A, 260B, 260n. Specifically, the values of supplied parameters for the return type 250 and the parameter types 260A, 260B, 260n can be constrained by the conditional logic of the conditions 250A, 270A, 270B, 270n. The conditional logic can be a source code expression to be evaluated at run-time, or conditional logic to be enforced during compile time. At compile time, the conditional logic can result in the logging of diagnostic information. In a preferred aspect of the invention, an "immediate" keyword" can be included in the compiler directive 200 as yet an additional constraint option. The immediate keyword can specify that the value of an associated argument must be known to the compiler during compile time. In this way, a built-in function can be supported and forced into use by the compiler directive.

Additionally, the conditions 250A, 270A, 270B, 270n can be used during an optimization phase of the compiler to improve performance of the computer program. Specifically, the constraint conditions can be used by the optimizer to aggressively exploit performance improvement opportunities. The immediate keyword enjoys a special use in this regard. Since the immediate keyword constrains a parameter to a compile-time constant, the compiler can use the immediate form of machine code instruction to operate upon the parameter. Such instructions are known to be more efficient.

Returning now to FIG. 1, the directive processing logic 140 can include logic for identifying a compiler directive 170 disposed in the source code 110. Responsive to detecting the compiler directive 170, the directive processing logic 140 can store the parameter values, return type, constraint information, and the specific implementation of the generic type in the supplemental dictionary 160. Subsequently, when a function call to the generic type is detected so that the parameters provided in the call match that which had been stored in the supplemental dictionary 160, the function call can be replaced with a call to the specific implementation. Moreover, the values for the parameters can be tested to assure compliance with any constraints specified in the compiler directive 170.

Figure 3:
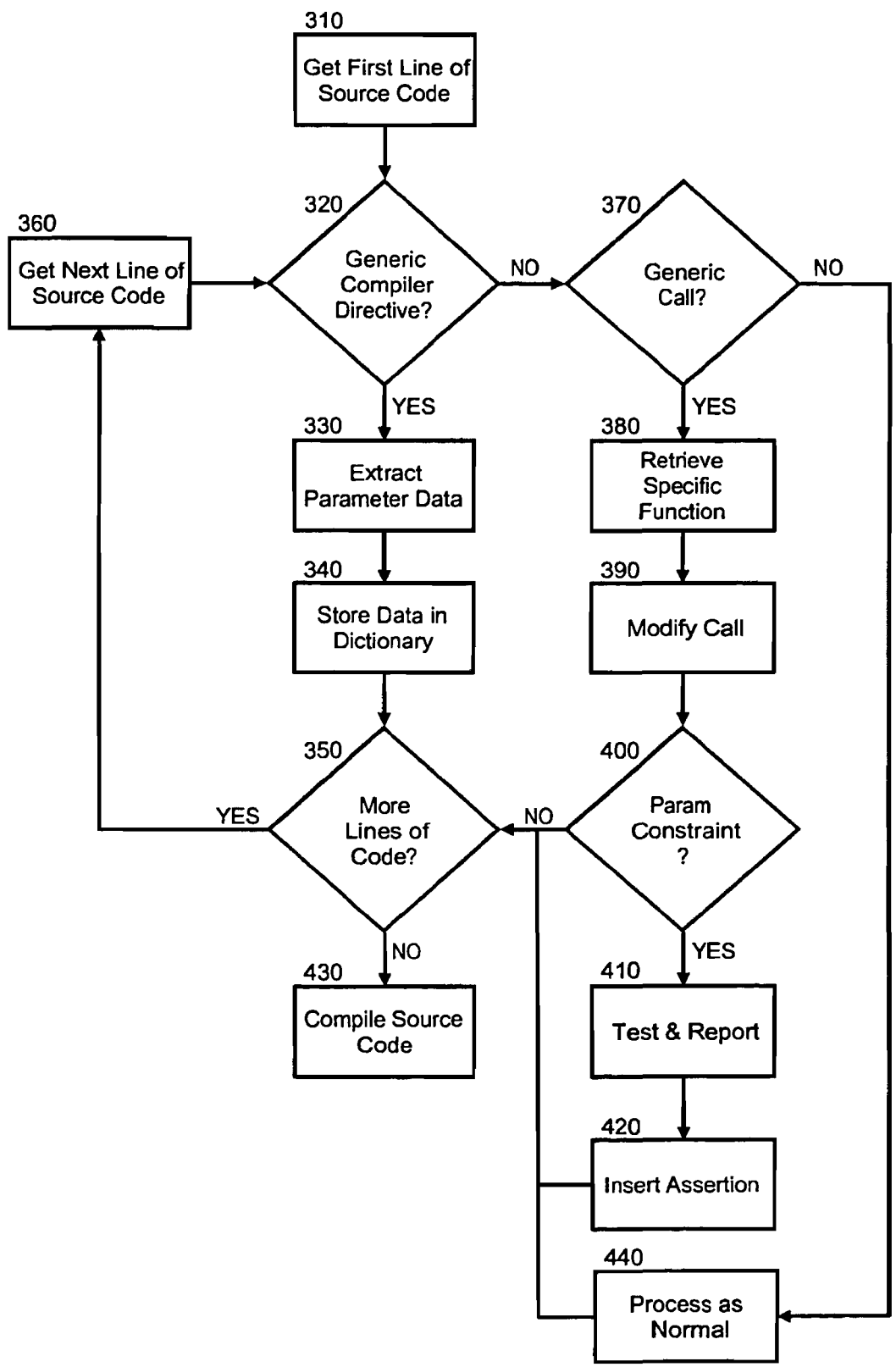

In further illustration of the inventive arrangements, FIG. 3 is a flow chart illustrating a process for managing program function parameters using a compiler directive. Beginning in block 310, a first line of source code can be retrieved for processing. In decision block 320, it can be determined if the line of source code is a type generic compiler directive. If not, in decision block 370, it further can be determined if the line of source code is a function call to a generic function prototype. If not, the source line can be processed normally in block 440 and it can yet further be determined if more source code lines remain to be processed. If not, the source code can be compiled in block 430.

Returning to decision block 320, if the line of source code is determined to be a type generic compiler directive, in block 330 parameter data and return type data can be extracted from the compiler directive. Moreover, conditional logic constraining the parameter data and return type data can be retrieved from the compiler directive. In block 340, the extracted data can be stored in a supplemental dictionary. Finally, if more source code lines remain to be processed as determined in decision block 350, in block 360 the next line of source code can be retrieved for processing and the process can be repeat through decision block 320.

Returning yet again to decision block 320, if in decision block 370 it is determined that the line of source code is a functional call to a generic function prototype, in block 380 the specific function associated with the parameters of the generic function call can be retrieved from the supplemental dictionary. In block 390, the generic functional call can be replaced with the specific function call. Notably, in decision block 400, if any of the parameters or the return type is constrained, in block 410, the constraining conditions can be evaluated and, to the extent required, a diagnostic report can be logged for the constraining condition. As an additional option, in block 420 an assertion corresponding to the constraining condition can be inserted into the source code to enforce the constraint at run-time.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer system for managing parameters, the computer system comprising:
a storage unit;
a processor unit;
a compiler coupled to a primary symbol-type dictionary; the compiler also coupled to a supplemental symbol-type dictionary containing a plurality of parameter data types for specific function calls of a corresponding generic type function; and
directive processing logic configured both to populate said supplemental symbol-type dictionary with entries associating each of said plurality of parameter data types with a specific function call of the corresponding generic type function based upon processor directives embedded in source code, and also to substitute said specific function calls for generic function calls in said source code by matching generic function call parameter data types provided by said generic function calls with said plurality of parameter data types contained in said supplemental symbol-type dictionary associated with said specific function calls prior to compiling said source code.

2. The system of claim 1, wherein said supplemental symbol-type dictionary further comprises return data types for said specific function calls.

3. The system of claim 1, wherein said supplemental symbol-type dictionary further comprises conditional constraints for said plurality of parameter data types.

4. The system of claim 3, wherein said conditional constraints comprise an immediate directive that invokes a built-in function.

5. The system of claim 1, wherein said processor directives are pragma statements.

6. A machine readable storage device having stored thereon a computer program for parameter management, the computer program comprising a set of instructions which when executed by a machine cause the machine to perform the steps of:
detecting a compiler directive disposed in source code;
extracting a generic function name, a specific function name and a plurality of parameter data types from said compiler directive;
populating a supplemental symbol-type dictionary with said plurality of parameter data types extracted from said compiler directive, wherein each of said plurality of parameter data types in said supplemental symbol-type dictionary are associated with a specific function call of a corresponding generic type function based upon said compiler directive disposed in said source code;
locating in said source code a generic function call having said generic function name;
substituting in said source code said specific function call having said specific function name for said generic function call by matching a parameter data type provided in said generic function call with a parameter data type populated in said supplemental symbol-type dictionary associated with said specific function call; and
compiling said source code.

7. The machine readable storage device of claim 6, wherein said extracting step further comprises the step of extracting a return data type, and wherein said populating step further comprises the step of populating said supplemental symbol-type dictionary with said return data type.

8. The machine readable storage device of claim 6, wherein said extracting step further comprises the step of extracting at least one constraining condition for said plurality of parameter data types, and wherein said populating step further comprises the step of populating said supplemental symbol-type dictionary with said at least one constraining condition.

9. The machine readable storage device of claim 8, further comprising another routine set of instructions for causing the machine to further perform the step of enforcing said at least one constraining condition for said plurality of parameter data types.

10. The machine readable storage device of claim 8, further comprising another routine set of instructions for causing the machine to further perform the step of inserting an assertion in said source code to enforce said at least one constraining condition for said plurality of parameter data types.

11. The machine readable storage device of claim 8, further comprising another routine set of instructions for causing the machine to further perform the step of invoking a built-in function based upon said at least one constraining condition.

12. The machine readable storage device of claim 8, further comprising another routine set of instructions for causing the machine to further perform the step of optimizing said source code based upon said at least one constraining condition.

* * * * *